Oct. 21, 1969  I. MOSCOVICH  3,473,229
HARMONOGRAPH
Filed Dec. 1, 1967
FIG. 1
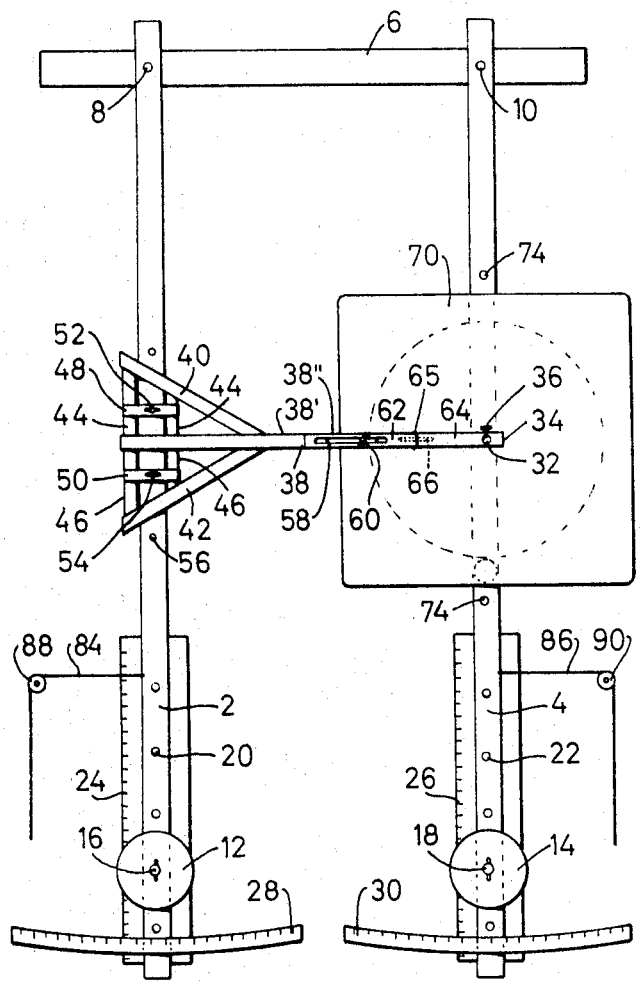
FIG. 2
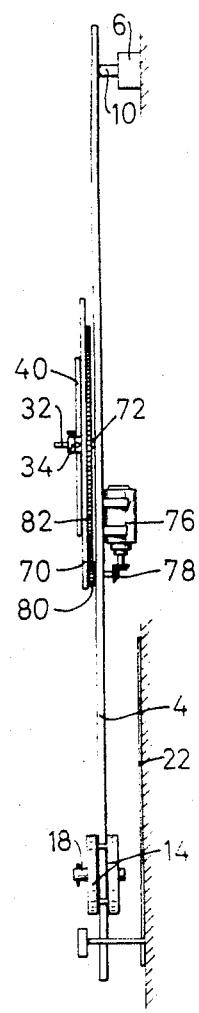
FIG. 3
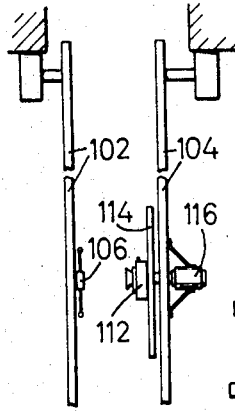
FIG. 4
FIG. 5
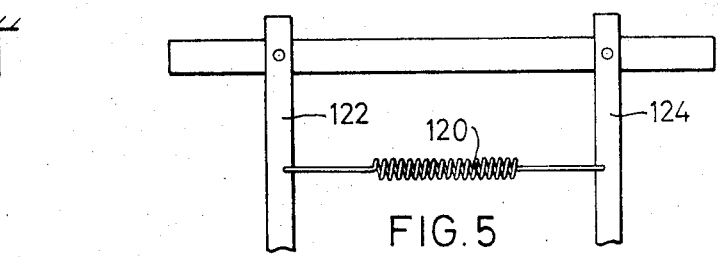
INVENTOR
IVAN MOSCOVICH
BY
ATTORNEY

United States Patent Office 3,473,229
Patented Oct. 21, 1969

3,473,229
HARMONOGRAPH
Ivan Moscovich, 3 Tagore St., Ramat Aviv, Israel
Filed Dec. 1, 1967, Ser. No. 687,289
Int. Cl. B43l 11/06
U.S. Cl. 33—27       10 Claims

ABSTRACT OF THE DISCLOSURE

A harmonograph is described for recording patterns or designs produced by harmonic and circular motions, comprising two pendulums pivotably mounted at their upper ends to oscillate in parallel directions, a recording device mounted on one pendulum, and a record-receiving member mounted on the other pendulum in position to enable the recording device to record thereon when the two pendulums are set in oscillation. The record-receiving member may be rotated about a horizontal axis during recording. In one described embodiment, the recording device is an ink-pen, and the record-receiving member is a sheet of paper. In a second described embodiment, the recording device comprises coloured light bulbs, and the record-receiving member is photographic film in a camera.

BACKGROUND OF THE INVENTION

Field of the invention

The present invention relates to recording instruments, and particularly to harmonographs, i.e. machines for recording patterns or designs produced by harmonic motions. Very interesting and attractive effects can be produced by such machines, and they are frequently used for demonstrating harmonic motions or for producing abstract designs for textiles or advertisements, or for entertainment, artistic, or educational purposes.

Description of the prior art

A number of different types of harmonographs have been constructed, but as a rule, they are usually very complicated and costly to manufacture, and/or are very limited in the intricacy, complexity, or variations in the designs they can produce.

SUMMARY OF THE INVENTION

An object of the present invention is to provide a harmonograph which is of very simple construction and operation, and which is capable of producing an endless variety of designs. Some of the designs produceable by the harmonograph of the present invention are believed to be virtually impossible of being produced by hand or by other known machines because of the complexity of the design and the fineness of its execution.

According to the invention, there is provided a harmonograph comprising two pendulums pivotably mounted to oscillate in parallel directions, a holder for a recording device mounted on one of the pendulums, and a holder for a record-receiving member mounted on the other pendulum in position to enable the recording device to record thereon when the two pendulums are set in oscillation.

In one embodiment of the invention, the recording device is a marking implement and the record-receiving member is a record sheet. More particularly, in this embodiment the recording device is an ink pen mounted on an arm extending parallel to the plane of the two pendulums and spring-pressed into engagement with the record-receiving member the latter being a sheet of paper disposed in a plane substantially parallel to the arm of the ink-pen.

In another disclosed embodiment, the recording device includes a source of light, and the record-receiving member is a light-sensitive sheet. In the illustrated arrangement, the source of light consists of a plurality of differently located coloured light bulbs mounted in a common plane, there being a camera oriented so that its photographic film is disposed in a plane substantially perpendicular to the plane of the two pendulums.

The harmonograph may include means, such as an electric motor, for rotating the record-receiving member about a horizontal axis. This adds to the endless variety of designs produceable by the harmonograph.

The harmonograph may also include a coil spring coupling the pendulums together. Besides enabling the harmonograph to produce further interesting designs, this feature increases its value as a teaching aid, e.g., for demonstrating principles of coupled pendulums and of resonance of mechanical systems.

Further features and advantages of the invention will be apparent from the description below.

BRIEF DESCRIPTION OF THE DRAWINGS

The invention is described herein, for purposes of example only, with respect to the accompanying drawings, wherein:

FIG. 1 is a front view illustrating one form of harmonograph constructed in accordance with the invention;

FIG. 2 is an end view of the harmonograph of FIG. 1;

FIG. 3 is an end view of another form of harmonograph constructed in accordance with the invention;

FIG. 4 is an enlarged view of a portion (the light-holder arm) of the harmonograph of FIG. 3; and FIG. 5 is a front view of a modification of the harmonograph of FIG. 1.

DESCRIPTION OF THE PREFERRED EMBODIMENTS

The harmonograph illustrated in FIGS. 1 and 2 includes a pair of pendulums 2 and 4 pivotably mounted, at their upper ends to oscillate in parallel directions, on a horizontal supporting bar 6 by means of ball bearing mountings 8 and 10, respectively. The two pendulums carry weights 12 and 14 at their lower ends, these weights being vertically adjustable along the pendulum by inserting pins 16 and 18 through openings in each weight and openings 20 and 22 in the respective pendulum. The vertical position of each weight can be present by reference to a graduated scale 24 and 26 each located behind its respective pendulum. A further graduated scale, 28 and 30 respectively, is located at the bottom of each pendulum enabling it to be set to a predetermined position before it is released for oscillation.

Pendulum 2 carries, below its pivotable mounting 8, a recording device in the form of an ink-pen 32 removably mounted in a holder 34 by screw 36. Holder 34 is fixed at one end of an arm 38 extending substantially parallel to the plane of the two pendulums 2 and 4. The opposite end of arm 38 is mounted on pendulum 2 and includes a pair of angular braces 40 and 42 fixed to the arm (as by welding), a pair of spaced cross-bars 44 between arm 38 and brace 40, and a further pair of spaced cross-bars 46 between arm 38 and brace 42. The arm of pendulum 2 is received within the spaces between bars 44 and bars 46 and is firmly clamped into position by means of plates 48 and 50 each carrying a thumb screw, 52 and 54, adapted to be received within an opening 56 in the pendulum. The vertical position of the ink pen 32 may be adjusted by inserting the thumb screws 52 and 54 into the appropriate openings 56.

The horizontal and angular position of the ink pen 32 may also be adjusted. For this purpose, arm 38 is made of two sections, 38' and 38" which are pivotable and slidable with respect to each other. Section 38" is formed with a slot 58, and section 38' carries a thumb screw 60 adapted to be passed through slot 58 and tightened, for adjusting section 38″, and thereby the ink pen 32, in the desired horizontal and angular position.

The ink pen 32 is spring-pressed in the direction of pendulum 4 so as to apply a very light pressure against the record sheet carried by the latter pendulum. For this purpose, section 38″ of arm 38 is made of two parts 62 and 64 hinged at 65. The hinged ends of the two parts carry a very light spring, such as rubber band 66 glued to the two parts, for urging part 64 in the direction of pendulum 4 and against the record sheet carried thereby.

The record sheet is carried on a table 70 rotatably mounted on pendulum 4, below its pivotable mounting 10, by means of a pin 72 passing through one of a plurality of openings 74 formed in the pendulum. Table 70 may be rotated by means of a motor 76 carried by the pendulum and driving gears 78, 80 and 82, the latter gear being fixed to table 70. Instead of a motor drive, the table could be rotated by a third pendulum and a clock mechanism driven thereby, in which case the complete machine would be gravity operated by three pendulums.

In using the harmonograph of FIGS. 1 and 2, the positions of the two pendulums are preset and then released for oscillation. As the two pendulums oscillate by gravity, ink pen 32 draws very fine lines on the paper sheet held by table 70, producing harmonograms, or abstract designs, in accordance with the harmonic motions of the two pendulums. The lines drawn are continuously varying because of the dissipation of the pendulum energy by the friction of the pen on the paper, as well as by the mounting friction. The designs produced are determined by the settings of the pendulum and in almost no case will they be identical because of the variables. The designs can be further varied by energising motor 76 to slowly rotate table 70. Further interesting effects can be produced by operating the harmonograph through a plurality of operations and substituting ink pens of different colours for different operations.

To facilitate presetting of the two pendulums before they are released for oscillation, each carries a string 84 and 86 adapted to pass over a roller 88 and 90, respectively. The ends of the strings are grasped by the user to preset the position of the pendulum, according to the graduated scales 28 and 30, and are then released to permit the pendulums to oscillate.

FIG. 3 illustrates another embodiment of the invention. In FIG. 3, one pendulum 102 carries a source of light which is used as the recording device, and another pendulum 104 carries a light-sensitive sheet serving as the record-receiving member. In FIG. 3, the source of light 106 is in the form of a plurality of coloured light bulbs 108 mounted in a common plane on an arm 110 fixed to pendulum 102 in a manner similar to how arm 38 is fixed on pendulum 2 of FIG. 1. The light-sensitive record member, in FIG. 3, is provided by a camera 112 mounted on pendulum 104 and oriented so that its photographic film is disposed in a plane substantially perpendicular to the plane of the two pendulums 102 and 104. The camera 112 in FIG. 3 is mounted on a table 114, concentrically or eccentrically, which table is rotated by motor 116. In use, the room of course must be dark, and the camera 112 must be set for a long exposure. The two pendulums are set in oscillation, and motor 116 is actuated to rotate table 114. The coloured light bulbs 108 produce very interesting abstract designs on the film in the camera.

FIG. 5 shows a variation in the harmonograph of FIG. 1, in that a coil spring 120 is coupled between the two pendulums 122 and 124. This feature further adds to the variety of the abstract designs producable by the harmonograph. In addition, the inclusion of a spring enables the harmonograph to be used as a teaching aid for demonstrating principles of coupled pendulums and of resonance of mechanical systems.

Further variations, modifications and applications of the invention will be apparent.

I claim:

1. A harmonograph comprising two pendulums pivotably mounted to oscillate in parallel directions, a holder for a recording device mounted on one of said pendulums, and a holder for a record-receiving member mounted on the other of said pendulum in position to enable said recording device to record thereon when the two pendulums are set in oscillation.

2. A harmonograph as defined in claim 1, wherein each of said two pendulums is pivotably mounted from its upper end, said holders being mounted on their respective pendulums below the pivotably mounted ends of the latter.

3. A harmonograph as defined in claim 1, further including means for rotating said record-receiving member holder about a horizontal axis.

4. A harmonograph as defined in claim 3, wherein said recording device holder is for a marking implement, and said record-receiving member holder is for a record sheet.

5. A harmonograph as defined in claim 4 wherein said marking implement holder is for an ink pen and is mounted on an arm extending parallel to the plane of the two pendulums and spring-pressed in the direction to bring the ink pen into engagement with the record sheet, and wherein said record sheet holder is for a sheet of paper to be disposed in a plane substantially parallel to said arm.

6. A harmonograph as defined in claim 3, wherein said recording device holder is for a source of light, and wherein said record-receiving member holder is for a light-sensitive sheet.

7. A harmonograph as defined in claim 6, wherein said source of light holder is for a plurality of differently located coloured light bulbs to be mounted in a common plane, and wherein said light-sensitive sheet holder is for a camera oriented so that its photographic film is disposed in a plane substantially perpendicular to the plane of the two pendulums.

8. A harmonograph as defined in claim 3, wherein each of said holders for the recording device and for the record-receiving member is adjustably mounted to different vertical positions along its respective pendulum.

9. A harmonograph as defined in claim 3, wherein each of said pendulums includes means enabling it to be set at a predetermined position before it is released for oscillation.

10. A harmonograph as defined in claim 3, further including a coil spring coupling said pendulums together.

References Cited

UNITED STATES PATENTS

| | | | |
|---|---|---|---|
| 898,599 | 9/1908 | Pearce | 33—27 |
| 1,869,951 | 8/1932 | Worthington | 33—27 |
| 3,143,807 | 8/1964 | Christie | 33—27 |
| 3,324,556 | 6/1967 | Everett | 33—27 |
| 3,331,078 | 7/1967 | Howland | 346—7 |
| 3,384,966 | 5/1968 | Lias | 33—27 |

JOSEPH W. HARTARY, Primary Examiner

U.S. Cl. X.R.

346—7, 107, 129